(12) United States Patent
Chandwani et al.

(10) Patent No.: US 9,942,896 B2
(45) Date of Patent: Apr. 10, 2018

(54) ALLOCATING RESOURCES OF AN UNLICENSED RADIO FREQUENCY SPECTRUM BAND AMONG MULTIPLE OPERATOR NETWORKS FOR CARRIER AGGREGATION

(71) Applicant: Verizon Patent and Licensing Inc., Arlington, VA (US)

(72) Inventors: Rakesh Chandwani, Morganville, NJ (US); Sergio Aguirre, Southlake, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 155 days.

(21) Appl. No.: 14/938,063

(22) Filed: Nov. 11, 2015

(65) Prior Publication Data

US 2017/0135095 A1 May 11, 2017

(51) Int. Cl.
*H04J 3/00* (2006.01)
*H04W 72/04* (2009.01)
*H04W 76/02* (2009.01)
*H04W 72/08* (2009.01)

(52) U.S. Cl.
CPC ..... *H04W 72/0446* (2013.01); *H04W 72/042* (2013.01); *H04W 72/082* (2013.01); *H04W 76/026* (2013.01)

(58) Field of Classification Search
None
See application file for complete search history.

(56) References Cited

U.S. PATENT DOCUMENTS

| 8,615,250 | B2 * | 12/2013 | Xing | H04W 16/14 370/231 |
|---|---|---|---|---|
| 2013/0070688 | A1 * | 3/2013 | Picker | H04W 88/08 370/329 |
| 2015/0085797 | A1 * | 3/2015 | Ji | H04J 3/16 370/329 |
| 2016/0174214 | A1 * | 6/2016 | Yerramalli | H04W 72/0413 370/329 |
| 2016/0249255 | A1 * | 8/2016 | Khawer | H04W 36/0005 |

(Continued)

OTHER PUBLICATIONS

3rd Generation Partnership Project, "3GPP TR 22.951 V12.0.0: 3rd Generation Partnership Project; Technical Specification Group Services and System Aspects; Service aspects and requirements for network sharing (Release 12)," http://www.3gpp.org/ftp/specs/archive/22_series/22.951/, Oct. 2, 2014, 19 pages.

(Continued)

*Primary Examiner* — Otis L Thompson, Jr.

(57) ABSTRACT

A base station may allocate resources of an unlicensed radio frequency (RF) spectrum band among multiple operator networks, associated with different network operators, that use different licensed RF spectrum bands. The base station may receive downlink traffic destined for a user equipment. The base station may identify an operator network, of the multiple operator networks, associated with the user equipment. The base station may provide the downlink traffic to the user equipment using one or more unlicensed RF channels of the unlicensed RF spectrum band based on identifying the operator network and based on allocating the resources of the unlicensed RF spectrum band among the multiple operator networks.

20 Claims, 5 Drawing Sheets

(56) References Cited

U.S. PATENT DOCUMENTS

2016/0302176 A1* 10/2016 Ahn .................... H04W 72/042
2016/0309463 A1* 10/2016 Khawer ............ H04W 72/0446
2016/0338107 A1* 11/2016 Zeng .................... H04W 16/14
2016/0345360 A1* 11/2016 Papaleo ................ H04W 74/08
2017/0041956 A1*  2/2017 Abraham .......... H04W 74/0816
2017/0048721 A1*  2/2017 Sun ...................... H04W 16/16
2017/0094528 A1*  3/2017 Takeda ................. H04W 16/14
2017/0118728 A1*  4/2017 Harada ................. H04W 52/38

OTHER PUBLICATIONS

3rd Generation Partnership Project, "3GPP TS 23.251 V13.1.0: 3rd Generation Partnership Project; Technical Specification Group Services and System Aspects; Network Sharing; Architecture and functional description (Release 13)," http://www.3gpp.org/ftp/specs/archive/23_series/23.251/, Mar. 12, 2015, 39 pages.

* cited by examiner

ALLOCATING RESOURCES OF AN UNLICENSED RADIO FREQUENCY SPECTRUM BAND AMONG MULTIPLE OPERATOR NETWORKS FOR CARRIER AGGREGATION

BACKGROUND

Wireless devices may communicate over an unlicensed radio frequency (RF) spectrum band using one or more radio access technologies, such as a Wi-Fi radio access technology, a long term evolution radio access technology, or the like. An unlicensed RF spectrum band may refer to an RF spectrum band that is open for shared use by any device that complies with regulatory agency rules for communicating via the RF spectrum band. In contrast with most licensed RF spectrum band usage, users of unlicensed RF spectrum bands do not typically have regulatory protection against radio interference from devices of other users. In other words, devices that use the unlicensed RF spectrum band must typically accept any radio interference caused by other devices that use the unlicensed RF spectrum band.

DETAILED DESCRIPTION OF PREFERRED EMBODIMENTS

The following detailed description of example implementations refers to the accompanying drawings. The same reference numbers in different drawings may identify the same or similar elements.

A wireless device, such as a user equipment (UE), may be capable of communicating using licensed RF spectrum bands and unlicensed RF spectrum bands. The licensed RF spectrum bands may be licensed for use by a particular network operator, while the unlicensed RF spectrum bands may not be licensed, and may be open for shared use by any device that complies with regulatory agency rules for communicating via the unlicensed RF spectrum bands. Network operators may wish to offload some network traffic from a licensed RF spectrum band to an unlicensed RF spectrum band to reduce network congestion, increase throughput, or the like, by aggregating the unlicensed RF spectrum band with the licensed RF spectrum band (e.g., using carrier aggregation). In some cases, a network operator may use a license-assisted access (LAA) technology to assist with this offloading. Using LAA, a UE may communicate with a base station using a licensed RF spectrum band as an anchor (e.g., to camp on the base station), and may receive some downlink communications via an unlicensed RF spectrum band using carrier aggregation.

Because the UE uses a licensed RF spectrum band for LAA, a base station deployed by a first network operator, with a license for a first licensed RF spectrum band, may not be compatible to permit LAA by a UE that is registered with a second network operator that has a license for a second licensed RF spectrum band. One technique to permit LAA by UEs registered with different network operators is to use multiple base stations associated with the different network operators. However, deploying multiple base stations in close proximity may cause RF interference on the unlicensed RF spectrum band, which may increase network congestion, reduce overall throughput, or the like. Furthermore, some venue owners (e.g., an owner of a stadium, an arena, etc.) may prohibit deployment of multiple base stations so as to reduce the amount of space required for such equipment. Implementations described herein permit LAA by UEs associated with different network operators by allocating, by a base station, resources of an unlicensed RF spectrum band to the different network operators, thereby reducing RF interference, reducing network congestion, and increasing throughput.

Figure 1A:
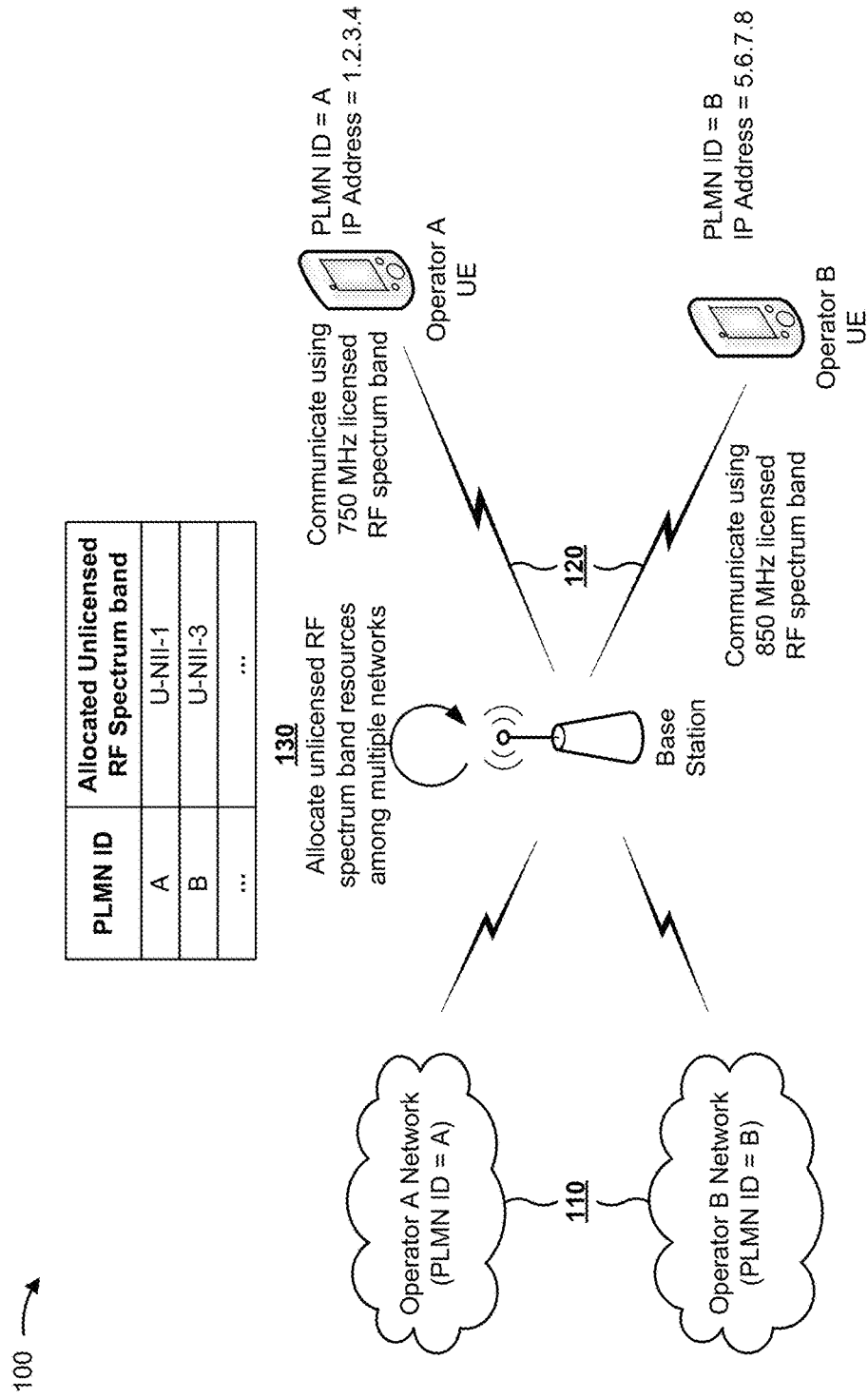
FIGS. 1A and 1B are diagrams of an overview of an example implementation described herein.
Figure 1B:
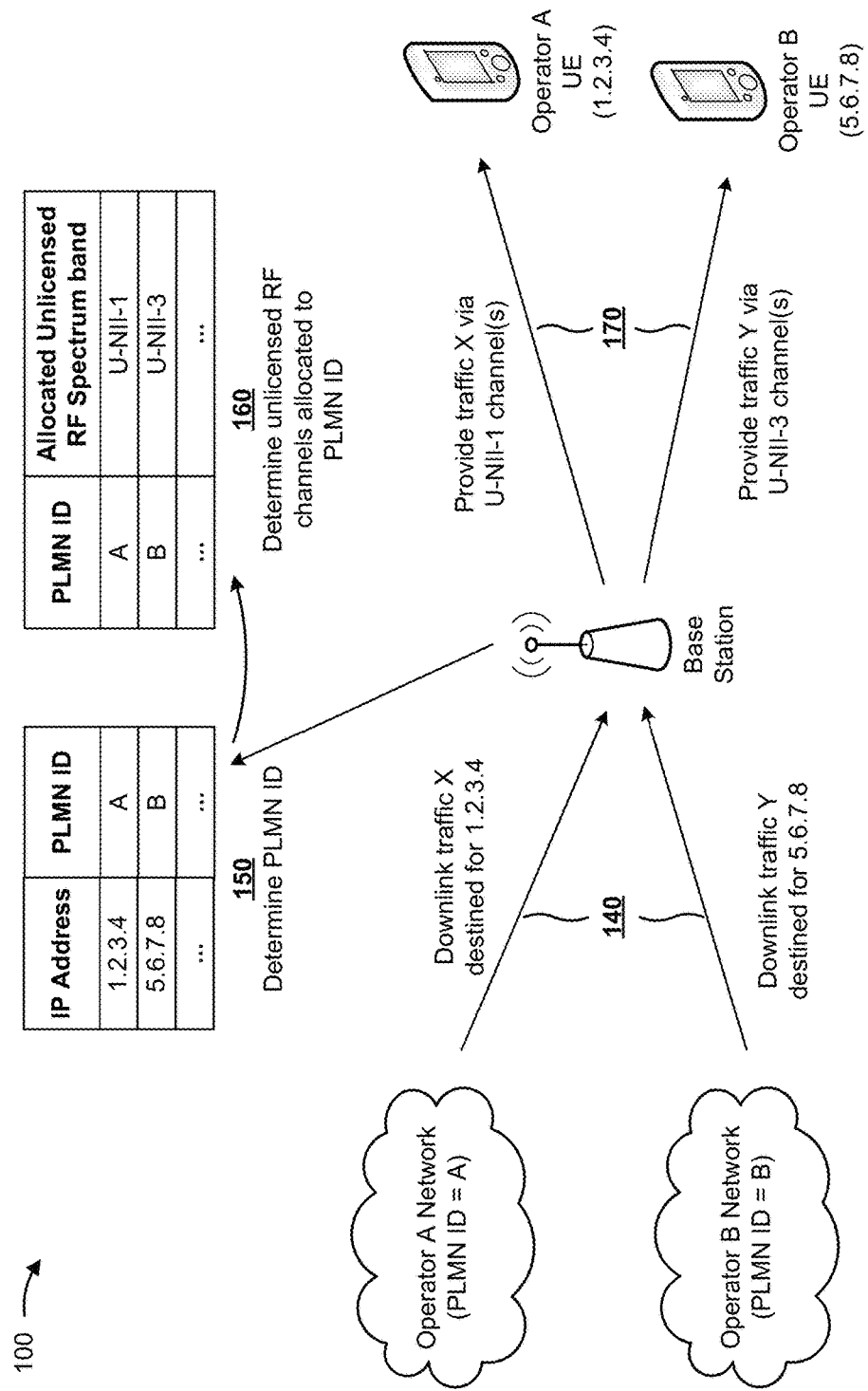

FIGS. 1A and 1B are diagrams of an overview of an example implementation 100 described herein. As shown in FIG. 1A, and by reference number 110, assume that a base station supports communications with multiple operator networks, shown as "Operator A Network" and "Operator B Network." Further, assume that the operator networks are identified using different network identifiers (e.g., public land mobile network (PLMN) IDs), shown as "PLMN ID=A" and "PLMN ID=B" for explanatory purposes. As shown by reference number 120, UEs registered with the different network operators use different licensed RF spectrum bands to communicate with the base station. For example, a UE registered with Operator A may use a 750 megahertz (MHz) licensed RF spectrum band to communicate with the base station, and a UE registered with Operator B may use an 850 MHz licensed RF spectrum band to communicate with the base station.

As shown by reference number 130, the base station may allocate resources of an unlicensed RF spectrum band among the multiple operator networks. For example, for Operator A's network, identified by a PLMN ID of "A," the base station may allocate unlicensed RF channels on the Unlicensed National Information Infrastructure (U-NII) Low RF spectrum band, shown as "U-NII-1" (e.g., with a frequency range from 5.150 gigahertz (GHz) to 5.250 GHz). As another example, for Operator B's network, identified by a PLMN ID of "B," the base station may allocate unlicensed RF channels on the U-NII Upper RF spectrum band, shown as "U-NII-3" (e.g., with a frequency range from 5.725 GHz to 5.825 GHz). In this way, the base station may allocate different portions of the unlicensed RF spectrum band to different operator networks, thereby reducing interference, increasing throughput, and the like. While shown as allocating resources of the unlicensed RF spectrum band in the frequency domain, in some implementations, the base station may allocate resources of the unlicensed RF spectrum band in the time domain or in both the frequency domain and the time domain. Additional details regarding allocating resources of the unlicensed RF spectrum band are described elsewhere herein.

As shown in FIG. 1B, and by reference number 140, assume that the base station receives downlink traffic "X" from Operator A's network, destined for a UE with an Internet Protocol (IP) address of 1.2.3.4, shown for explanatory purposes. As further shown by reference number 140, assume that the base station receives downlink traffic "Y" from Operator B's network, destined for a UE with an IP address of 5.6.7.8. As shown by reference number 150, the base station may determine PLMN IDs corresponding to the operator networks from which the downlink traffic is received. For example, the base station may use an IP address of the UE to determine the PLMN ID of the operator network on which the UE is registered.

As shown by reference number 160, the base station may use the PLMN ID to determine the unlicensed RF channels allocated to the operator network associated with the PLMN ID. For example, the base station may determine that unlicensed RF channels on the U-NII-1 band are allocated to Operator A's network (with a PLMN ID of A), and that unlicensed RF channels on the U-NII-3 band are allocated to Operator B's network (with a PLMN ID of B). Based on this determination, the base station may provide downlink traffic to a UE using the allocated unlicensed RF channels allocated to the operator network on which the UE is registered. For example, and as shown by reference number 170, the base station may provide downlink traffic X, from Operator A's network, to a UE registered with Operator A's network using channels on the U-NII-1 band. As further shown, the base station may provide downlink traffic Y, from Operator B's network, to a UE registered with Operator B's network using channels on the U-NII-3 band.

Thus, the base station may allocate resources of the unlicensed RF spectrum band (e.g., in the frequency domain, in the time domain, etc.) among multiple operator networks for delivery of downlink data to UEs utilizing license-assisted access. In this way, the base station may reduce RF interference on the unlicensed RF spectrum band, thereby improving signal quality, increasing throughput, and reducing network congestion. Furthermore, the base station may increase efficiencies in sharing unlicensed RF spectrum band between multiple network operators.

As indicated above, FIGS. 1A and 1B are provided merely as an example. Other examples are possible and may differ from what was described with regard to FIGS. 1A and 1B.

Figure 2:
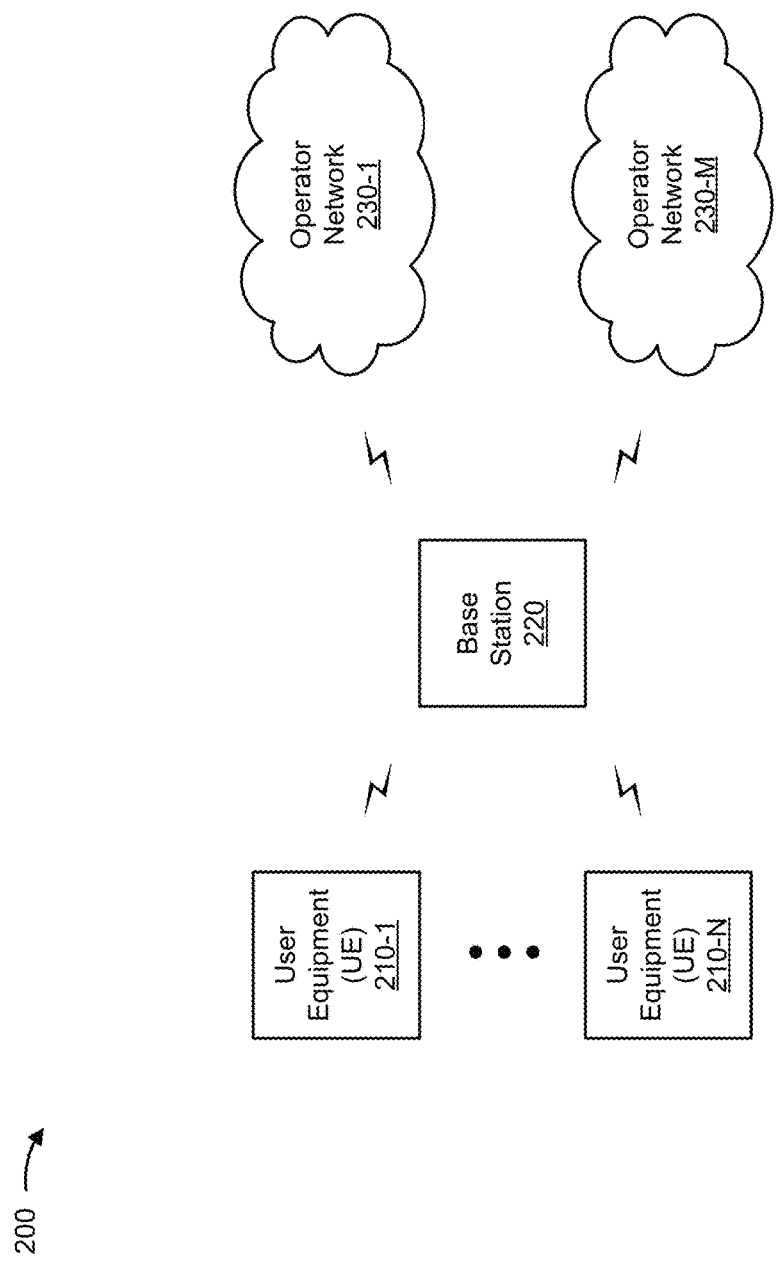
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user equipment (UEs) 210-1 through 210-N (N≥1) (hereinafter referred to collectively as "UEs 210," and individually as "UE 210"), a base station 220, and one or more operator networks 230-1 through 230-M (M>1) (hereinafter referred to collectively as "operator networks 230," and individually as "operator network 230"). Devices of environment 200 may interconnect via wired connections, wireless connections, or a combination of wired and wireless connections.

UE 210 may include one or more devices capable of connecting to a network via base station 220 and an unlicensed RF spectrum band. For example, UE 210 may include a communication device, such as a mobile phone (e.g., a smart phone, a radiotelephone, etc.), a laptop computer, a tablet computer, a gaming device, a wearable communication device (e.g., a smart wristwatch, a pair of smart eyeglasses, etc.), a machine-to-machine communication device, or a similar type of device.

In some implementations, UE 210 may be capable of connecting to a network (e.g., operator network 230) using license-assisted access. In this case, UE 210 may use a licensed RF spectrum band, associated with operator network 230, as an anchor with base station 220, and may use one or more unlicensed RF spectrum bands to receive downlink data from operator network 230 (e.g., via base station 220). Additionally, or alternatively, UE 210 may be registered with a first operator network 230, and may not be registered with a second operator network 230. In this case, UE 210 may be capable of communicating with base station 220 via a first licensed RF spectrum band (e.g., licensed for use by the first operator network 230), and may not be capable of communicating with base station 220 via a second licensed RF spectrum band (e.g., licensed for use by the second operator network 230).

Base station 220 may include one or more devices capable of transferring traffic, such as audio, video, text, and/or other traffic, destined for and/or received from UE 210. In some implementations, base station 220 may communicate wirelessly with UE 210 using one or more wireless communication protocols, such as, for example, the Institute of Electrical and Electronics Engineers (IEEE) 802.11 protocol (e.g., Wi-Fi), a long term evolution in unlicensed spectrum (LTE-U) protocol, or the like. For example, base station 220 may include a base station of a radio access network, a node B, an evolved node B, a large cell base station (e.g., a base station of a macrocell), a small cell base station (e.g., a base station of a microcell, a picocell, a femtocell, etc.), or the like.

Base station 220 may provide UE 210 with access to an unlicensed RF spectrum band to permit UE 210 to communicate using the unlicensed RF spectrum band. In some implementations, the unlicensed RF spectrum band may be used by base station 220 and UE 210 registered with an operator network 230 (e.g., a cellular network) for Long Term Evolution (LTE) communications and/or LTE-Advanced (LTE-A) communications, and by Wi-Fi access points and Wi-Fi stations of a Wi-Fi network for Wi-Fi communications. The unlicensed RF spectrum band may be used by operator network 230 in combination with, or independent from, a licensed RF spectrum band. In some implementations, the unlicensed RF spectrum band may be an RF spectrum band for which UE 210 may need to contend for access because the RF spectrum band is available, at least in part, for unlicensed use, such as Wi-Fi use.

As an example, the unlicensed RF spectrum band may include one or more radio frequencies (e.g., one or more radio frequency spectrum bands) included in the radio spectrum (e.g., the portion of the electromagnetic spectrum corresponding to radio frequencies, or frequencies lower than approximately 300 gigahertz (GHz)). In some implementations, the unlicensed RF spectrum band may include one or more RF spectrum bands that are open for shared use by any device that complies with regulatory agency rules (e.g., associated with a particular country) for communicating via the one or more RF spectrum bands. For example, the unlicensed RF spectrum band may include one or more radio frequencies between approximately 5 GHz and approximately 6 GHz. As a more specific example, the unlicensed RF spectrum band may include one or more radio frequencies between approximately 5.15 GHz and approximately 5.825 GHz.

As another example, the unlicensed RF spectrum band may include one or more RF spectrum bands defined by the United States Federal Communications Commission (FCC) as the Unlicensed National Information Infrastructure (U-NII) radio band. The U-NII radio band may include, for example, a first RF spectrum band between approximately 5.15 GHz and approximately 5.25 GHz (e.g., the U-NII Low band, or U-NII-1), a second RF spectrum band between approximately 5.25 GHz and approximately 5.35 GHz (e.g., the U-NII Mid band, or U-NII-2), a third RF spectrum band between approximately 5.47 GHz and approximately 5.725 GHz (e.g., the U-NII Worldwide band, or U-NII-2e), and/or a fourth RF spectrum band between approximately 5.725 GHz and approximately 5.825 GHz (e.g., the U-NII Upper band, or U-NII-3).

The unlicensed RF spectrum band may be divided into RF channels via which RF communications may be transmitted. For example, the unlicensed RF spectrum band may include one or more channels of approximately 20 MHz bandwidth. UE 210 may communicate via an RF channel included in the unlicensed RF spectrum band. For example, UE 210 may communicate via an RF channel using a Wi-Fi radio access technology, an LTE radio access technology, or the like.

Operator network 230 may include one or more wired and/or wireless networks. For example, operator network 230 may include a radio access network, a cellular network (e.g., an LTE network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some implementations, operator network 230 may include a core network of a cellular network operator.

In some implementations, a first operator network 230 may be licensed to use a first licensed RF spectrum band (e.g., to communicate with UEs 210), and a second operator network 230 may be licensed to use a second licensed RF spectrum band. As an example, the licensed RF spectrum band may include an RF spectrum band operating in the 800 MHz range, an RF spectrum band operating in the 900 MHz range, an RF spectrum band operating in the 1,800 MHz range, an RF spectrum band operating in the 1,900 MHz range, or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
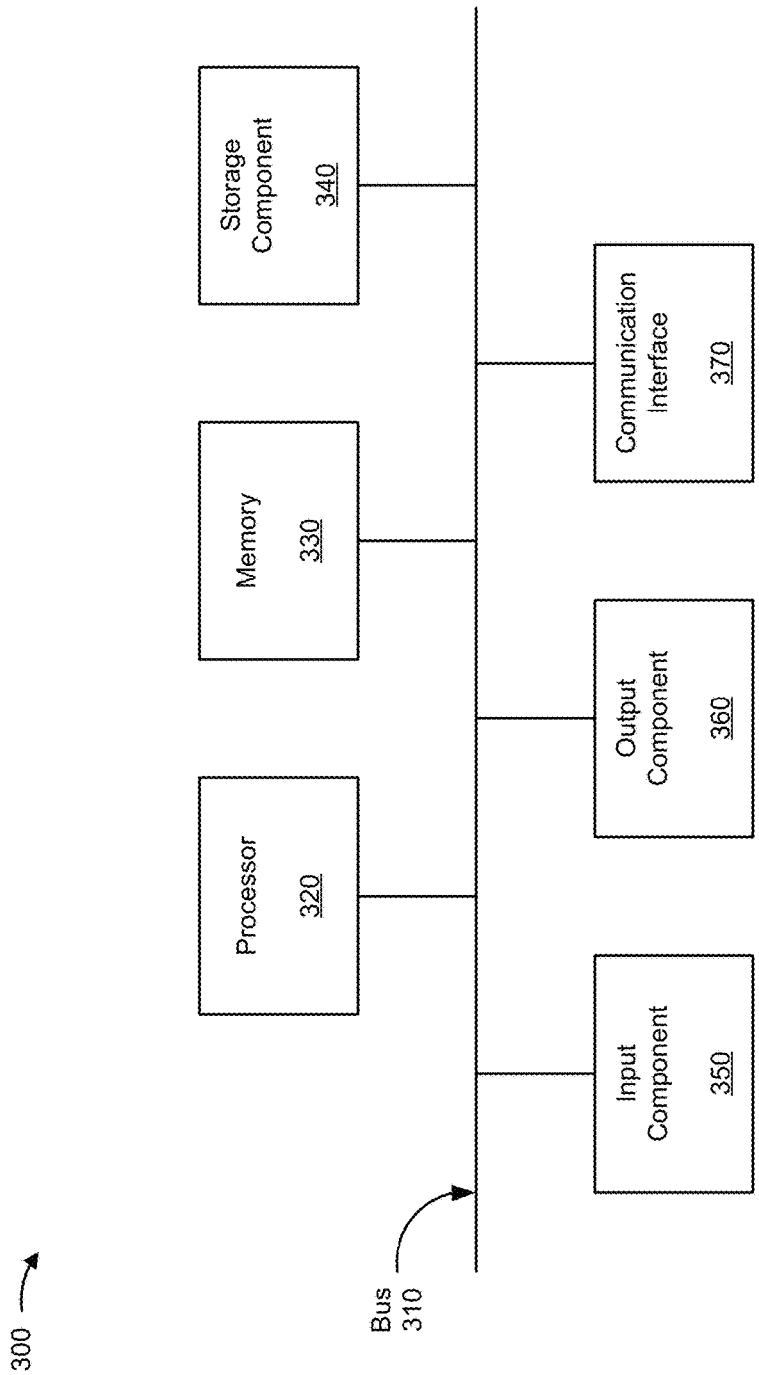
FIG. 3 is a diagram of example components of one or more devices of FIG. 2.

FIG. 3 is a diagram of example components of a device 300. Device 300 may correspond to UE 210 and/or base station 220. In some implementations, UE 210 and/or base station 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
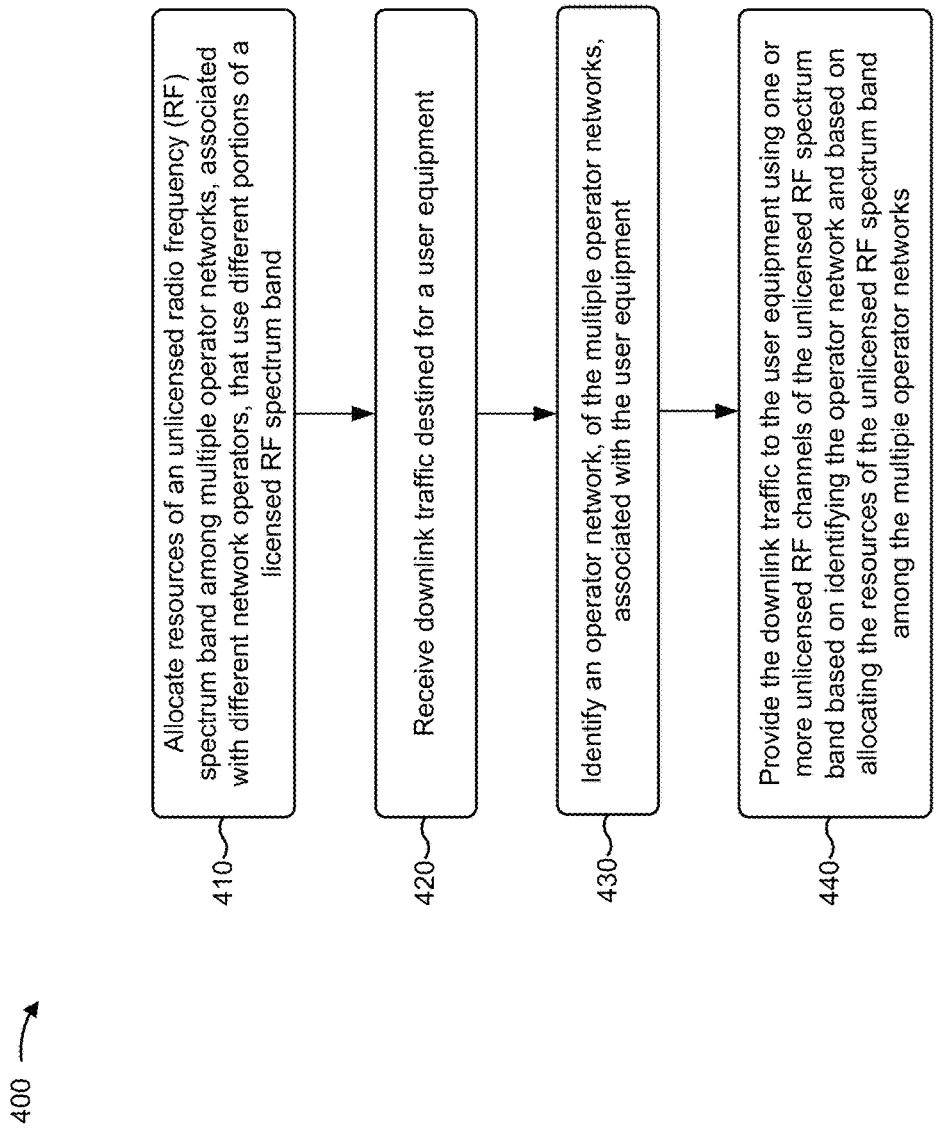
FIG. 4 is a flow chart of an example process for allocating resources of an unlicensed radio frequency spectrum band among multiple operator networks for carrier aggregation.

FIG. 4 is a flow chart of an example process 400 for allocating resources of an unlicensed radio frequency spectrum band among multiple operator networks for carrier aggregation. In some implementations, one or more process blocks of FIG. 4 may be performed by base station 220. In some implementations, one or more process blocks of FIG. 4 may be performed by another device or a group of devices separate from or including base station 220, such as UE 210.

As shown in FIG. 4, process 400 may include allocating resources of an unlicensed radio frequency (RF) spectrum band among multiple operator networks, associated with different network operators, that use different portions of a licensed RF spectrum band (block 410). For example, base station 220 may allocate resources of an unlicensed RF spectrum band among multiple operator networks 230. In some implementations, different operator networks 230 may use different portions of a licensed RF spectrum band. For example, different operator networks 230 may be associated with (e.g., owned by, operated by, managed by, controlled by, etc.) different network operators, and the different network operators may be licensed to use different portions of the licensed RF spectrum band (e.g., by a government agency). As an example, a first network operator may be licensed to use a 750 megahertz (MHz) licensed RF spectrum band (e.g., for communications between UE 210 and base station 220), and a second network operator may be licensed to use an 850 MHz licensed RF spectrum band. In some implementations, operator network 230 may be identified by a network identifier, such as a PLMN ID or the like.

In some implementations, UE 210 may support carrier aggregation using license-assisted access, where UE 210 camps on base station 220 using a licensed RF spectrum band as an anchor, and receives downlink communications from base station 220 via one or more unlicensed RF channels via carrier aggregation. Base station 220 may support communications with multiple operator networks 230 associated with different licensed RF spectrum bands used by different UEs 210 as anchors (e.g., different UEs 210 registered with different operator networks 230). To mitigate RF interference between multiple UEs 210 registered with different operator networks 230, base station 220 may allocate resources of the unlicensed RF spectrum band among the different operator networks 230, as described below.

In some implementations, base station 220 may allocate resources of the unlicensed RF spectrum band in the frequency domain. For example, base station 220 may allocate different portions of the unlicensed RF spectrum band (e.g., different sets of channels) to different operator networks 230. As an example, base station 220 may allocate channels on the U-NII-1 band to a first operator network 230, may allocate channels on the U-NII-2 band to a second operator network 230, may allocate channels on the U-NII-2e band to a third operator network 230, may allocate channels on the U-NII-3 band to a fourth operator network 230, or the like. In this way, base station 220 may reduce RF interference by preventing multiple operator networks 230 from communicating with UEs 210 using the same unlicensed RF channel.

Additionally, or alternatively, base station 220 may allocate resources of the unlicensed RF spectrum band in the time domain. For example, base station 220 may allocate (e.g., queue) downlink traffic for transmission to UEs 210, and/or may transmit downlink traffic to UEs 210, in different time slots or sets of time slots for different operator networks 230. As an example, base station 220 may queue first downlink traffic from a first operator network 230 for transmission during a first time slot, may queue second downlink traffic from a second operator network 230 for transmission during a second time slot (e.g., subsequent to the first time slot), may queue third downlink traffic from a third operator network 230 for transmission during a third time slot (e.g., subsequent to the first time slot and the second time slot), or the like. In this way, base station 220 may reduce RF interference by preventing multiple operator networks 230 from communicating with UEs 210 at the same time.

In some implementations, base station 220 may allocate resources of the unlicensed RF spectrum band in both the frequency domain and the time domain. For example, base station 220 may queue first downlink traffic from a first operator network 230 for transmission using a first set of unlicensed RF channels during a first time slot, may queue second downlink traffic from a second operator network 230 for transmission using the first set of unlicensed RF channels during a second time slot, may queue third downlink traffic from a third operator network 230 for transmission using a second set of unlicensed RF channels during the first time slot, may queue fourth downlink traffic from a fourth operator network 230 for transmission using the second set of unlicensed RF channels during the second time slot, or the like. In this way, base station 220 may reduce RF interference by preventing multiple operator networks 230 from communicating with UEs 210 at the same time on the same channel.

In some implementations, the allocation used by base station 220 may be static for a particular time period. For example, base station 220 may receive configuration information that indicates a manner in which base station 220 is to allocate resources of the unlicensed RF spectrum band (e.g., in the frequency domain, in the time domain, etc.). The configuration information may include one or more parameters (e.g., a set of channels to be allocated to operator network 230, a set of time slots to be allocated to operator network 230, etc.), and base station 220 may be configured based on the one or more parameters. In some implementations, base station 220 may use a configuration, defined by the one or more parameters, for a particular time period (e.g., a current time period). For example, base station 220 may use the configuration until base station 220 receives different configuration information. Additionally, or alternatively, base station 220 may use different configurations for different time periods (e.g., peak hours, off-peak hours, etc.).

In some implementations, the allocation used by base station 220 may be dynamic. For example, base station 220 may receive configuration information that includes a set of rules that indicate a manner in which base station 220 is to allocate resources of the unlicensed RF spectrum band (e.g., based on whether one or more conditions are satisfied). For example, base station 220 may allocate resources of the unlicensed RF spectrum band based on an availability of one or more sets of RF channels, based on an availability of one or more sets of time slots, based on a quantity of network traffic associated with one or more operator networks 230, based on a network congestion level, based on a priority level of network traffic, or the like. Additionally, or alternatively, base station 220 may allocate resources between a licensed RF spectrum band, associated with operator network 230, and an unlicensed RF spectrum band based on a set of rules similar to those described above. As an example, base station 220 may allocate resources of a licensed RF spectrum band for high priority traffic (e.g., voice traffic), and may allocate resources of an unlicensed RF spectrum band for low priority traffic (e.g., best efforts traffic).

In some implementations, base station 220 may allocate resources equally among two or more operator networks 230 (e.g., so that different operator networks 230 are allocated the same quantity of resources, such as unlicensed RF channels, time slots, etc.). In some implementations, base station 220 may allocate resources unequally among two or more operator networks 230 (e.g., so that different operator networks 230 are allocated a different quantity of resources, such as unlicensed RF channels, time slots, etc.).

Base station 220 may use an allocation of resources of the unlicensed RF spectrum band when providing downlink traffic to one or more UEs 210, as described in more detail below. In this way, base station 220 may reduce RF interference, may reduce network congestion, may increase traffic throughput, or the like.

As further shown in FIG. 4, process 400 may include receiving downlink traffic destined for a user equipment (block 420), and identifying an operator network, of the multiple operator networks, associated with the user equipment (block 430). For example, base station 220 may receive downlink traffic, destined for UE 210, and may identify an operator network 230 associated with UE 210. In some implementations, base station 220 may identify an operator network 230 with which UE 210 is registered. In this way, base station 220 may determine resources of an unlicensed RF spectrum band allocated to operator network 230, as described elsewhere herein. Additionally, or alternatively, base station 220 may determine that UE 210 is registered with another operator network 230 that is permitted to use operator network 230 via a roaming agreement between network operators.

In some implementations, the downlink traffic may include a device identifier that identifies UE 210. In some implementations, the device identifier may include a network address, such as an IP address (e.g., a destination IP address that identifies UE 210 as a destination of the downlink traffic) or another type of network address (e.g., a media access control (MAC) address, etc.). Additionally, or alternatively, the device identifier may include an international mobile equipment identity (IMEI), a mobile directory number (MDN), an international mobile subscriber identity (IMSI), a globally unique temporary identifier (GUTI), or the like. Base station 220 may use the device identifier for UE 210, included in the downlink traffic, to determine an operator network 230 associated with UE 210.

In some implementations, base station 220 may store information that indicates a relationship between a device identifier of UE 210 and a network identifier of operator network 230 associated with UE 210 (e.g., an operator network 230 with which UE 210 is registered). For example, base station 220 may store information that indicates a relationship between an IP address of UE 210 and a PLMN ID of operator network 230 with which UE 210 is registered. In some implementations, base station 220 may receive information indicative of this relationship during a network attach procedure (e.g., based on a selected PLMN ID, selected by UE 210 during a network attach procedure).

In some implementations, base station 220 may store the information that indicates the relationship between the device identifier and the network identifier in a data structure. In this case, base station 220 may search the data structure using the device identifier included in the downlink traffic, and may determine a network identifier, associated with the device identifier, based on the search. Additionally, or alternatively, another device may store the information that indicates the relationship between the device identifier and the network identifier. In this case, base station 220 may request the network identifier by providing the device identifier to the other device, and may receive the network identifier from the other device based on providing the device identifier.

As an example, base station 220 may store multiple PLMN IDs corresponding to multiple operator networks 230. When UE 210 connects to base station 220, base station 220 may determine a PLMN ID associated with UE 210, and may store information that indicates a relationship between an IP address assigned to UE 210 and the determined PLMN ID. When downlink traffic is received by base station 220, base station 220 may identify a destination IP address from the downlink traffic, and may use the destination IP address to identify the PLMN ID associated with that destination IP address. Additionally, or alternatively, the PLMN ID (or another network identifier) may be included in the downlink traffic, and base station 220 may identify the PLMN ID from the downlink traffic. Base station 220 may use the identified PLMN ID to determine a set of unlicensed RF channels via which to provide the downlink traffic to UE 210 (e.g., based on an allocation of resources of the unlicensed RF spectrum band), as described in more detail below.

In some implementations, base station 220 may use the information that indicates the relationship between a device identifier and a network identifier to determine where to send uplink traffic received from UE 210. For example, base station 220 may receive uplink traffic from UE 210, may identify a device identifier (e.g., a source IP address) from the uplink traffic, and may use the device identifier to determine a network identifier (e.g., a PLMN ID) associated with UE 210. Additionally, or alternatively, the network identifier may be included in the uplink traffic, and base station 220 may identify the network identifier from the uplink traffic. Base station 220 may provide (e.g., route) the uplink traffic toward the appropriate operator network 230 based on the network identifier (e.g., to a gateway of operator network 230, such as a serving gateway (SGW), a packet data network gateway (PGW), etc.). In this way, base station 220 may support multiple operator networks 230, thereby increasing efficiency.

As further shown in FIG. 4, process 400 may include providing the downlink traffic to the user equipment using one or more unlicensed RF channels of the unlicensed RF spectrum band based on identifying the operator network and based on allocating the resources of the unlicensed RF spectrum band among the multiple operator networks (block 440). For example, base station 220 may determine an allocation of resources (e.g., channels, time slots, etc.) to the identified operator network 230, and may provide the downlink traffic to UE 210 using the allocated resources. The allocated resources may include, for example, a set of unlicensed RF channels allocated to operator network 230, a set of time slots allocated to operator network 230, or the like.

In some implementations, when base station 220 allocates resources in the frequency domain, base station 220 may identify a set of unlicensed RF channels allocated to operator network 230. In this case, base station 220 may provide the downlink traffic to UE 210 via one or more unlicensed RF channels included in the set of unlicensed RF channels allocated to operator network 230. For example, base station 220 may identify one or more available unlicensed RF channels included in the set, and may provide the downlink traffic to UE 210 via the one or more available channels (e.g., using carrier aggregation).

In some implementations, when base station 220 allocates resources in the time domain, base station 220 may identify a set of time slots allocated to operator network 230. In this case, base station 220 may provide the downlink traffic to UE 210 during one or more time slots included in the set of time slots allocated to operator network 230. For example, base station 220 may identify one or more available time slots included in the set, and may provide the downlink traffic to UE 210 during the one or more time slots. In some implementations, base station 220 may use any available unlicensed RF channel to provide the downlink traffic during the one or more time slots. Additionally, or alternatively, when base station 220 allocates resources in both the time domain and the frequency domain, base station 220 may use a set of RF channels allocated to operator network 230 to provide the downlink traffic during the one or more time slots.

In some implementations, when base station 220 allocates resources based on a set of rules, base station 220 may identify a set of resources (e.g., a set of unlicensed RF channels, a set of time slots, etc.) allocated to operator network 230 based on the set of rules (e.g., by determining whether one or more conditions are satisfied). In this case, base station 220 may provide the downlink traffic to UE 210 using one or more unlicensed RF channels and/or during one or more time slots identified based on the set of rules.

In this way, multiple operator networks 230 may use a single base station 220 to communicate with UEs 210 via an unlicensed RF spectrum band, thereby increasing efficiency. Furthermore, base station 220 may allocate resources of the unlicensed RF spectrum band among the multiple operator networks 230, thereby reducing RF interference, increasing network throughput, and reducing network congestion.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein permit licensed-assisted access, via a single base station 220, to an unlicensed RF spectrum band by UEs associated with different network operators. By allocating resources of the unlicensed RF spectrum band to the different network operators, the base station may reduce RF interference, reduce network congestion, increase network throughput, or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A base station, comprising:
one or more memories; and
one or more processors, communicatively coupled to the one or more memories, to:
allocate resources of an unlicensed radio frequency (RF) spectrum band among multiple operator networks, associated with different network operators,
the multiple operator networks being allocated different portions of the unlicensed RF spectrum band to prevent the multiple operator networks from communicating via a same unlicensed RF channel,
a first portion of the unlicensed RF spectrum band having a different frequency from a second portion of the unlicensed RF spectrum band,
the first portion of the unlicensed RF spectrum being allocated to a first network operator, and
the second portion of the unlicensed RF spectrum being allocated to a second network operator;
receive downlink traffic destined for a user equipment;
identify an operator network, of the multiple operator networks, associated with the user equipment; and
provide the downlink traffic to the user equipment using one or more unlicensed RF channels of the unlicensed RF spectrum band based on identifying the operator network and based on allocating the resources of the unlicensed RF spectrum band among the multiple operator networks.

2. The base station of claim 1, where the operator network is a first operator network;
where the one or more processors, when allocating the resources of the unlicensed RF spectrum band, are to:
allocate a first set of unlicensed RF channels, of the unlicensed RF spectrum band, to the first operator network;

allocate a second set of unlicensed RF channels, of the unlicensed RF spectrum band, to a second operator network of the multiple operator networks; and where the one or more processors, when providing the downlink traffic to the user equipment using the one or more unlicensed RF channels, are to:

provide the downlink traffic to the user equipment using the one or more unlicensed RF channels,
the one or more unlicensed RF channels being included in the first set of unlicensed RF channels.

3. The base station of claim 1, where the operator network is a first operator network;

where the one or more processors, when allocating the resources of the unlicensed RF spectrum band, are to:
allocate a first set of time slots, of the unlicensed RF spectrum band, to the first operator network;
allocate a second set of time slots, of the unlicensed RF spectrum band, to a second operator network of the multiple operator networks; and where the one or more processors, when providing the downlink traffic to the user equipment using the one or more unlicensed RF channels, are to:

provide the downlink traffic to the user equipment during one or more time slots included in the first set of time slots.

4. The base station of claim 1, where the base station is in communication with the user equipment via a licensed RF spectrum band licensed for use by the operator network.

5. The base station of claim 4, where the licensed RF spectrum band is used as an anchor for the user equipment to connect to the base station; and where the one or more unlicensed RF channels are used for carrier aggregation.

6. The base station of claim 1, where the one or more processors, when allocating the resources of the unlicensed RF spectrum band, are to:

receive configuration information that identifies a set of rules that indicate a manner in which the base station is to allocate the resources of the unlicensed RF spectrum band; and
allocate the resources of the unlicensed RF spectrum band based on the set of rules.

7. The base station of claim 1, where the one or more processors, when allocating the resources of the unlicensed RF spectrum band, are to:

determine one or more conditions associated with allocating the resources of the unlicensed RF spectrum band;
determine whether the one or more conditions are satisfied; and
allocate the resources of the unlicensed RF spectrum band based on determining whether the one or more conditions are satisfied.

8. A non-transitory computer-readable medium storing instructions, the instructions comprising:

one or more instructions that, when executed by one or more processors, cause the one or more processors to:
allocate resources of an unlicensed radio frequency (RF) spectrum band among a plurality of operator networks to communicate with a plurality of user equipment,
the plurality of operator networks being allocated different portions of the unlicensed RF spectrum band to prevent the plurality of operator networks from communicating via a same unlicensed RF channel, a first portion of the unlicensed RF spectrum band having a different frequency from a second portion of the unlicensed RF spectrum band,
the first portion of the unlicensed RF spectrum being allocated to a first network operator, and
the second portion of the unlicensed RF spectrum being allocated to a second network operator;
receive downlink traffic destined for a user equipment of the plurality of user equipment;
identify an operator network, of the plurality of operator networks, with which the user equipment is registered; and
provide the downlink traffic to the user equipment using one or more unlicensed RF channels of the unlicensed RF spectrum band based on identifying the operator network and based on allocating the resources of the unlicensed RF spectrum band among the plurality of operator networks.

9. The non-transitory computer-readable medium of claim 8, where the resources of the unlicensed RF spectrum band include unlicensed RF channels of the unlicensed RF spectrum band.

10. The non-transitory computer-readable medium of claim 8, where the resources of the unlicensed RF spectrum band include time slots associated with the unlicensed RF spectrum band.

11. The non-transitory computer-readable medium of claim 8, where the resources of the unlicensed RF spectrum band include unlicensed RF channels of the unlicensed RF spectrum band and time slots associated with the unlicensed RF spectrum band.

12. The non-transitory computer-readable medium of claim 8, where the one or more instructions, that cause the one or more processors to allocate the resources of the unlicensed RF spectrum band, cause the one or more processors to:

receive configuration information that identifies one or more parameters for configuring allocation of the resources; and
allocate the resources of the unlicensed RF spectrum band based on the one or more parameters.

13. The non-transitory computer-readable medium of claim 8, where the one or more instructions, that cause the one or more processors to allocate the resources of the unlicensed RF spectrum band, cause the one or more processors to:

allocate the resources of the unlicensed RF spectrum band based on at least one of:
an availability of one or more sets of unlicensed RF channels of the unlicensed RF spectrum band,
an availability of one or more sets of time slots associated with the unlicensed RF spectrum band,
a quantity of network traffic associated with one or more operator networks of the plurality of operator networks,
a network congestion level associated with the unlicensed RF spectrum band or the licensed RF spectrum band, or
a priority level of the downlink traffic.

14. A method, comprising:

allocating, by a base station, a plurality of resources of an unlicensed radio frequency (RF) spectrum band among a plurality of operator networks,
the plurality of operator networks being allocated different portions of the unlicensed RF spectrum band to prevent the plurality of operator networks from communicating via a same unlicensed RF channel, a first portion of the unlicensed RF spectrum band having a different frequency from a second portion of the unlicensed RF spectrum band,
the first portion of the unlicensed RF spectrum being allocated to a first network operator, and
the second portion of the unlicensed RF spectrum being allocated to a second network operator;
receiving, by the base station, network traffic destined for a user equipment;
determining, by the base station, an operator network, of the plurality of operator networks, associated with the user equipment,
the user equipment being in communication with the base station via a licensed RF spectrum band licensed for use by the operator network; and
providing, by the base station, the network traffic to the user equipment using one or more resources, of the plurality of resources of the unlicensed RF spectrum band, allocated to the operator network.

15. The method of claim 14, where the plurality of resources includes at least one of:
a plurality of unlicensed RF channels of the unlicensed RF spectrum band, or
a plurality of time slots associated with the unlicensed RF spectrum band.

16. The method of claim 14, where allocating the plurality of resources comprises:
determining a current time period; and
allocating the plurality of resources based on the current time period.

17. The method of claim 14, where determining the operator network associated with the user equipment comprises:
determining a device identifier, included in the network traffic, that identifies the user equipment;
determining a network identifier, associated with the device identifier, that identifies the operator network; and
determining the operator network based on the network identifier.

18. The method of claim 17, where the device identifier includes a destination internet protocol address assigned to the user equipment, and
where the network identifier includes a public land mobile network identifier assigned to the operator network.

19. The method of claim 14, where determining the operator network associated with the user equipment comprises determining that the user equipment is registered with another operator network permitted to use the operator network via a roaming agreement.

20. The method of claim 14, where the base station and the user equipment communicate via carrier aggregation using one or more licensed RF channels of the licensed RF spectrum band and one or more unlicensed RF channels of the unlicensed RF spectrum band.

* * * * *